Jan. 17, 1950　　　　　　G. B. HILL　　　　　　2,494,707
SIDECAR FOR BICYCLES
Filed Dec. 23, 1947　　　　　　　　　　　4 Sheets-Sheet 2
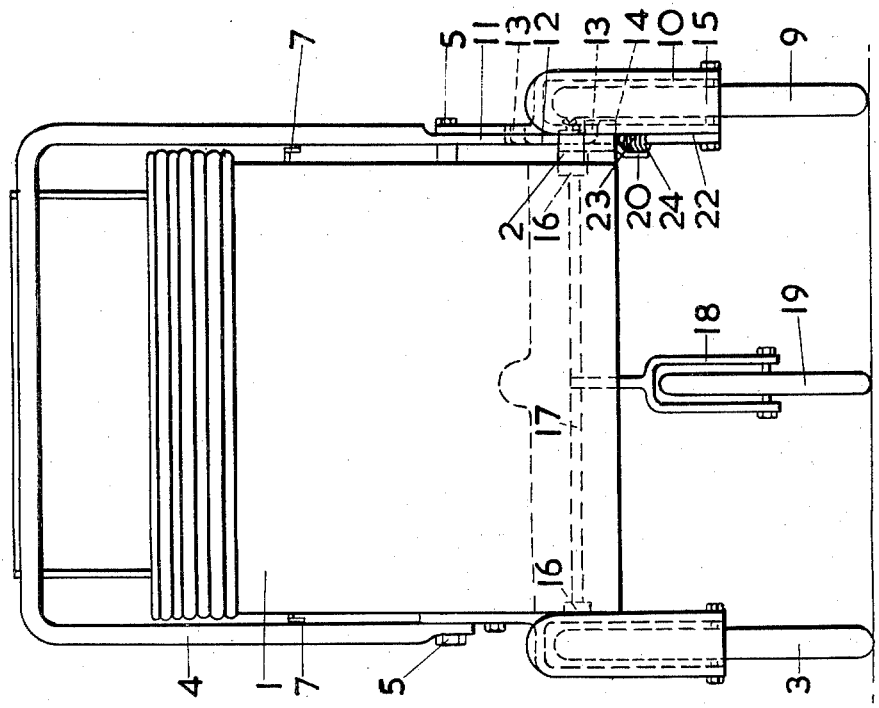
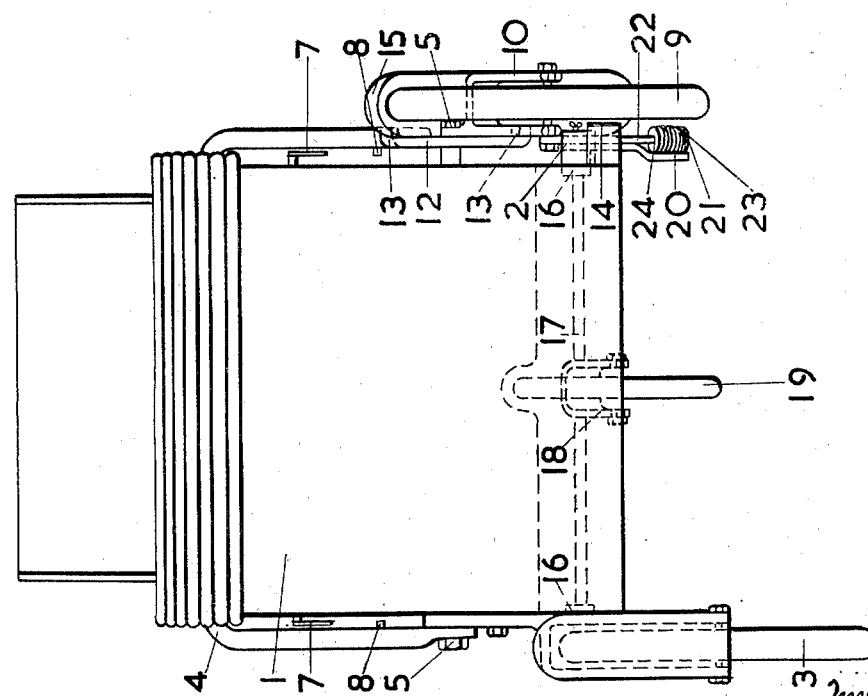
Inventor:
George Benjamin Hill
by Walter S. Bleston
ATTORNEY

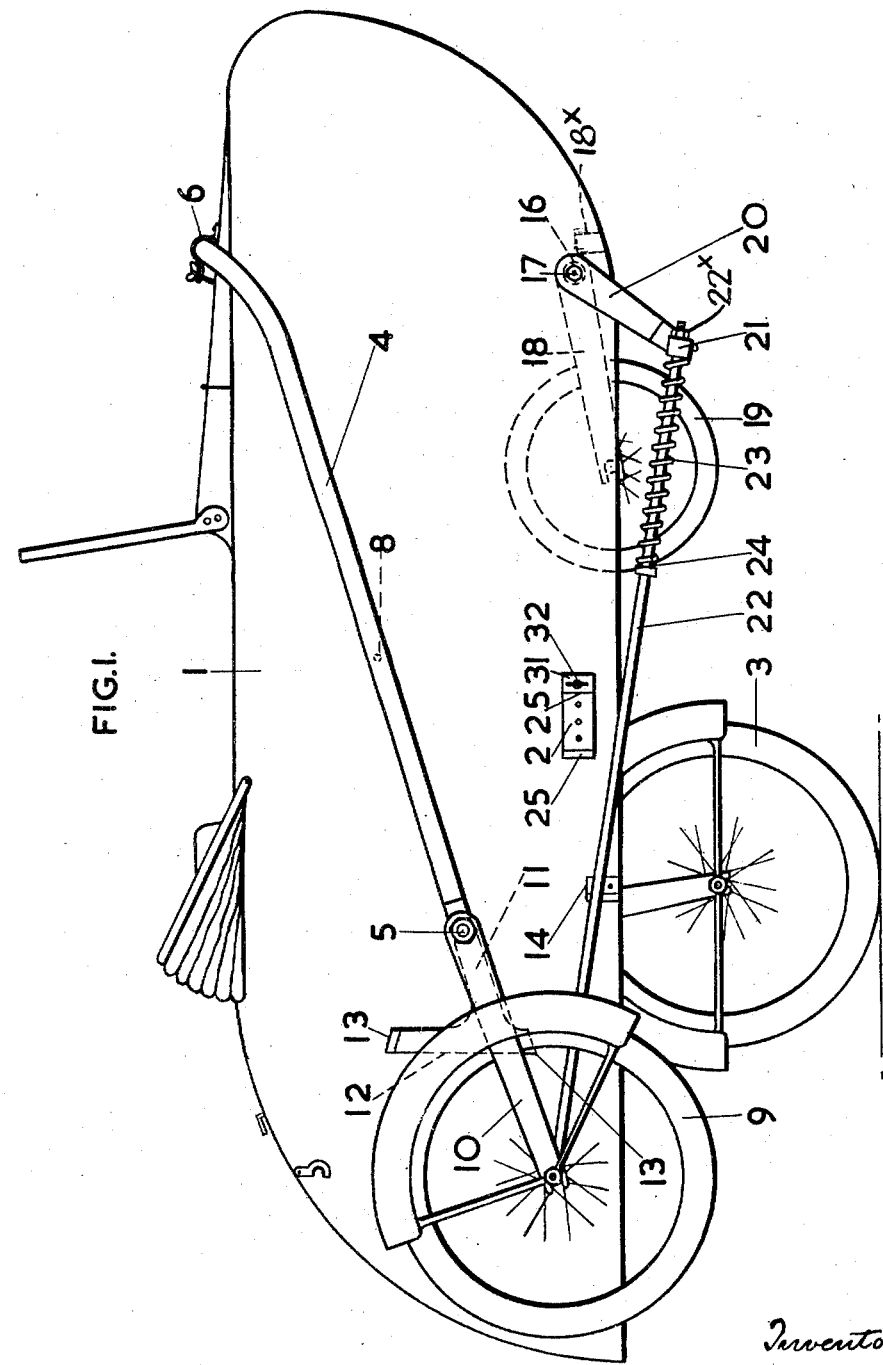

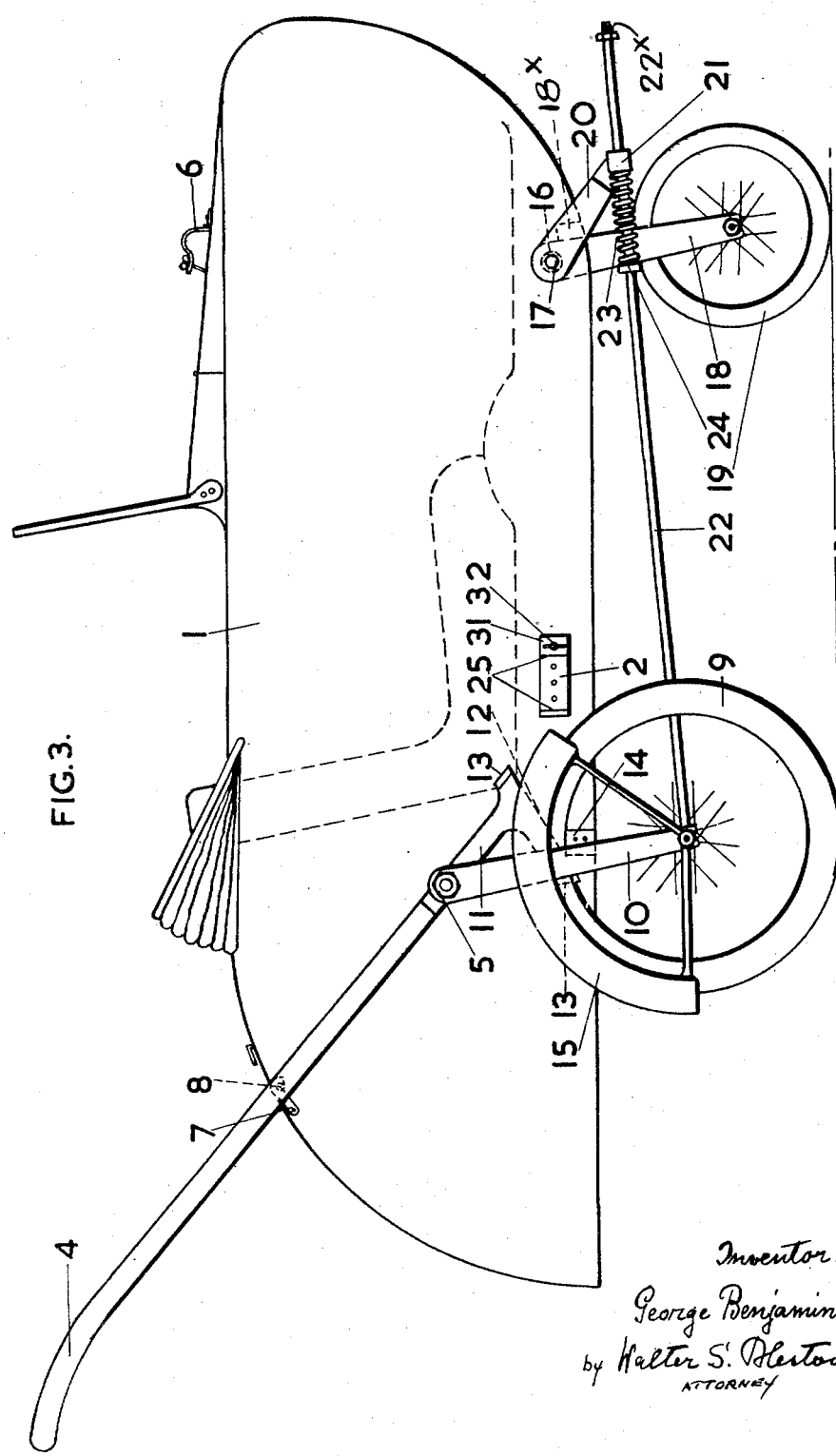

Jan. 17, 1950          G. B. HILL          2,494,707
SIDECAR FOR BICYCLES
Filed Dec. 23, 1947          4 Sheets-Sheet 4
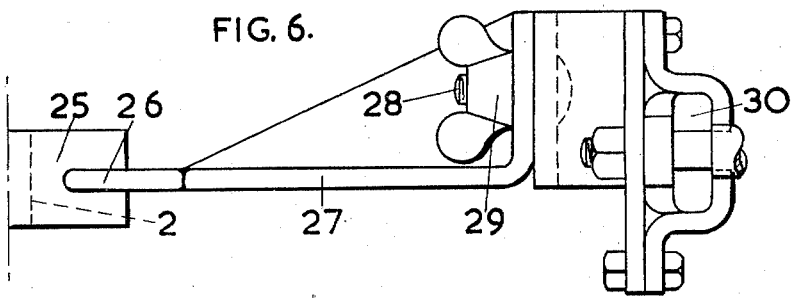
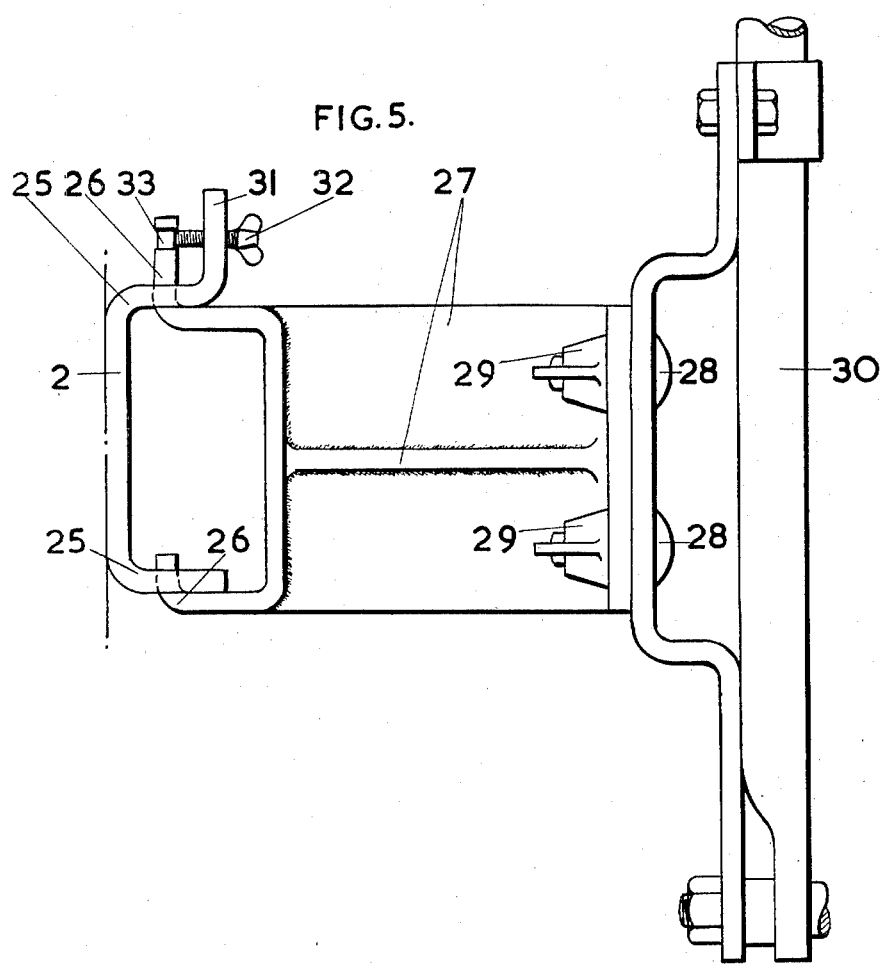

Patented Jan. 17, 1950

2,494,707

UNITED STATES PATENT OFFICE 2,494,707

SIDECAR FOR BICYCLES

George Benjamin Hill, Cheltenham, England

Application December 23, 1947, Serial No. 793,537
In Great Britain December 31, 1946

11 Claims. (Cl. 280—203)

This invention relates to side cars for bicycles and more particularly to children's side cars for pedal bicycles, the chief object being to provide a side car which in addition to its use as such can be detached from the bicycle and used as a perambulator, baby carriage, hand-propelled luggage truck or the like.

A side car according to the present invention is provided with two or more wheels of which one is fixed or stationarily mounted and serves as the usual single side car wheel when the side car is used with the bicycle and the other or others of which is or are adapted to be brought into ground engagement when the side car is, or is to be, detached from the bicycle and used as a perambulator, baby carriage or the like.

Preferably the wheel or wheels other than the fixed or stationarily mounted one is or are adapted to be brought into ground engagement by the erection of a collapsible handle for propelling the side car when detached from the bicycle and used as a separate vehicle, the folding down or collapsing of said handle automatically causing said other wheel or wheels to be raised clear of the ground.

In order that the invention may be clearly understood, it will now be more fully described with reference to the embodiment shown, by way of example, in the accompanying drawings, wherein:

Figs. 1 and 2 are a side elevation and a rear end view respectively of a side car with its wheels in the positions they would occupy when the side car is coupled up for use with a bicycle.

Figs. 3 and 4 are similar views to Figs. 1 and 2 respectively but show all the wheels in their ground engaging positions and the handle erected for propelling the side car when used as a separate vehicle or baby carriage.

Figs. 5 and 6 are fragmentary views showing in plan and rear elevation respectively the means for detachably connecting the side car to the rear wheel fork or stay of the bicycle frame.

Referring to the drawings, and more particularly to Figs. 1 to 4 inclusive, the side car body 1 has fixed to one side wall an attachment bracket 2 whereby it is adapted to be hingedly connected to another attachment bracket on the bicycle frame as hereinafter more fully described. At the other side of the side car body 1 is the usual fixed or stationarily mounted ground wheel 3.

A U-shaped propelling handle 4 straddles the side car body 1 and has its limbs pivotally connected to the opposite side walls thereof through axially aligned pivot studs 5 projecting from said walls. The arrangement is such that the handle 4 can be turned down so as to project forwardly from the pivots 5 and lie in a more or less horizontal position as shown in Figs. 1 and 2, with the cross-bar portion of the handle across the forward part of the side car body 1, or be turned up into an erected position, as shown in Figs. 3 and 4, in which it projects upwardly and rearwardly with the cross-bar portion over or somewhat to the rear of the rear part of the side car body 1. The handle 4 is adapted to be retained in its folded down position by a releasable clip 6 secured to the top of the side car body 1 and adapted to engage the cross-bar portion of the handle 4 (see Fig. 1), whilst catches 7 of hook-like form are pivoted in appropriate positions on the side walls of the body 1 for engagement with inwardly directed catch pegs 8 on the limbs of the handle 4 so as to retain the latter in its erected position (see Fig. 3).

A wheel 9, similar to the stationarily mounted wheel 3, is revolubly mounted in a fork 10 which is pivoted on that stud 5 which projects from the side car wall to which the attachment bracket 2 is secured. The handle limb on this side of the body 1 is formed with an extension 11 projecting beyond the pivot stud 5, which extension 11 has a cross piece 12 with laterally projecting spaced abutments 13 to co-operate with opposite sides of the adjacent limb of the fork 10 and afford a lost-motion operative connection between the handle 4 and said fork 10. The arrangement is such that when the handle 4 is in its fully erected position (Fig. 3) the fork 10 is held against a stop 14 fixed to the adjacent side of the body 1 and the wheel 9 is in its ground engaging position in axial alignment with the fixed or stationarily mounted wheel 3, whilst when the handle 4 is turned into its fully collapsed or down position the fork 10, after the initial part of this movement, is swung automatically into a position in which the wheel 9 carried thereby is well clear of the ground (Fig. 1). The stop 14 which limits the downward swinging movement of the fork 10 to determine the ground engaging position of the wheel 9 engages the forward edge of the innermost limb of said fork and preferably is also adapted to engage the outer side face of said limb so as to locate it against the adjacent side wall of the body 1 to prevent lateral movement of the fork 10 when its wheel 9 is in its ground engaging position. The fork 10 carries a mudguard 15 for its wheel 9.

Mounted in bearings 16 in the forward part of the side car body 1 is a transversely disposed rock shaft 17 to which is fixed at a central position a fork member 18 carrying a front wheel 19. One end of the rock shaft 17 projects through the adjacent side wall of the body 1 and its projecting end has fixed to it a depending actuating arm 20 carrying a swivel bearing block 21 at its end remote from the rock shaft 17. A connecting rod 22 which slides through a bore in the swivel bearing block 21 has its rear end pivotally connected to swinging fork 10 and a helical compression spring 23 operating between a fixed collar 24 on the rod 22 and the rear face of the block 21 urges the latter forwardly along the rod 22 and tends to maintain it against a nut 22ˣ screwed on the forward end of said rod. The arrangement of the lever and link mechanism between the swinging fork 10 and the rock shaft 17 is such that when the fork 10 is swung upwardly by the collapsing or folding down of the handle 4 the rock shaft 17 is operated to raise the front wheel 19 clear of the ground and vice versa.

When the wheel 9 is engaged with the ground, the front wheel 19 is maintained in its operative position by the action of the spring 23 urging the fork 18 against an appropriately located stop which may conveniently comprises a bar 18ˣ fixed across the under side of the body.

When raised clear of the ground the front wheel 19 passes through a slot in the bottom of the side car body, into a position in which it is wholly or partially accommodated in said body. In a modification, instead of a centrally located front wheel, there may be two front wheels carried by forks one on each end of the transverse rockshaft, both ends of which would project through the side walls of the body so that the front wheel forks would be located alongside said walls, and that front wheel fork on the same side as the swinging fork 10 would carry the swivel bearing block for the connecting rod which operatively connects the rockshaft to the said folk 10.

The attachment bracket 2 has forward and rear laterally extending flanges 25 provided with aligned bearing holes to receive two forwardly directed ends of a hinge pin 26 fixed to the attachment bracket 27 which is secured by bolts 28 and winged nuts 29 to the adjacent limb of the rear wheel fork 30 of the bicycle frame (see Figs. 5 and 6). A forwardly directed part 31 on the bracket 2 carries a locking screw 32 which is screwed up to engage in an annular recess or groove at 33 in the hinge pin 26 so as to retain the latter against disengagement from the bearing holes. Upon unscrewing the screw 32 so as to disengage it from the groove 33, the bicycle can be pulled back or the side car moved forwardly so as to disengage the hinge pin 26 from the bearing holes and enable the side car and bicycle to be parted. In this connection the brackets are so disposed that the axis of the hinge coupling is either horizontal or has a small inclination upwardly and forwardly.

I claim:

1. A side car for a bicycle, comprising in combination a carriage body, a stationarily mounted ground-engaging wheel which serves as the usual single car wheel when the side car is used with the bicycle, at least one other ground wheel movably mounted to said body and having two end positions, the first one being a ground-engaging position, the second one an inoperative position, a handle movably mounted to said body and having also two end positions, the first one being an operative position for propelling the car when used as a separate vehicle, the second one being an inoperative position, and a connection between said second wheel and said handle for common movement so that one of them is in its first position when the other one is in its second position.

2. A side car as claimed in claim 1, said handle being foldably mounted to said car body, the first end position of said handle being one in which it projects rearwardly from the car, and its second position being one in which it is substantially flush with the car body.

3. A side car for a bicycle, comprising in combination a carriage body, a stationarily mounted ground-engaging wheel on one side of the body which serves as the usual single car wheel when the side car is used with the bicycle, another ground wheel mounted in a fork pivoted to the opposite side of the body, a U-shaped handle for propelling the side car when it is detached from the bicycle for use as a separate vehicle, which handle straddles the body and has its limbs pivotally connected to the side walls thereof through axially aligned pivots, and an operative connection between said pivoted wheel fork and the handle limb on said other side of the body whereby when the handle is turned down into a forwardly directed position, with its cross bar portion across the forward part of the body, the pivoted wheel fork is moved into a position in which its wheel is raised clear of the ground and when the handle is turned up into an erected propelling position said fork is moved into a position in which its wheel is in ground engagement and in transverse alignment with the stationarily mounted ground wheel.

4. A side car for a bicycle as claimed in claim 3, wherein the operative connection between the pivoted wheel fork and the handle provides for lost motion so that it is only after the initial part of the forward and downward movement of the handle that the wheel carried by the fork is raised from the ground.

5. A side car for a bicycle as claimed in claim 3, wherein the handle limb which operates the pivoted wheel fork is extended beyond its pivot and its extension has a cross piece with spaced laterally projecting abutments to co-operate with opposite sides of said fork and afford a lost motion connection therewith.

6. A side car for a bicycle as claimed in claim 3, wherein the ground-engaging position for the wheel carried by the pivoted fork is determined by a stop which is fixed to the carriage body and limits the movement of the fork.

7. A side car for a bicycle as claimed in claim 3, wherein a stop fixed to the carriage body engages the edge and outer side face of the innermost limb of the pivoted fork to determine the ground-engaging position of the wheel carried by said fork and locate said fork limb against the adjacent side of the carriage body.

8. A side car for a bicycle as claimed in claim 3, wherein at least one further ground wheel is provided at the front part of the side car and is operatively connected to the pivoted wheel fork so as to be raised clear of the ground when the wheel in said fork is raised by the folding down of the handle and vice versa.

9. A side car for a bicycle as claimed in claim 3, wherein at least one further ground wheel is carried by a radial arm from a rock shaft at the front part of the side car and said rock shaft is operatively connected through a lever and link mechanism with the pivoted wheel fork so that said further ground wheel is raised clear of the ground when the wheel in said fork is raised by the folding down of the handle and vice versa.

10. A side car for a bicycle as claimed in claim 3, wherein at least one further ground wheel is carried by a radial arm from a rock shaft at the front part of the side car and in which said rock shaft has fixed thereto an actuating arm having a sliding and spring-loaded pivotal connection with a connecting rod which has an operative connection with the pivoted wheel fork so that said further ground wheel is raised clear of the ground when the wheel in said fork is raised by the folding down of the handle and vice versa.

11. In combination with a side car for a bicycle as claimed in claim 1, means for detachably securing it to the bicycle, said means comprising an attachment bracket on the side car having forward and rear laterally extending flanges with aligned bearing holes, an attachment bracket adapted to be secured to the bicycle and having a hinge pin with forwardly directed ends which are adapted to be received in said bearing holes, one of said ends having an annular groove affording a reduced portion or neck, said first mentioned attachment bracket having a forwardly directed part carrying a locking screw which is adapted to be engaged in said annular groove so as to hold the hinge pin against disengagement from said bearing holes.

GEORGE BENJAMIN HILL.

REFERENCES CITED

The following references are of record in the file of this patent:

UNITED STATES PATENTS

| Number | Name | Date |
| --- | --- | --- |
| 1,170,265 | Hudry | Feb. 1, 1916 |

FOREIGN PATENTS

| Number | Country | Date |
| --- | --- | --- |
| 24,482 | Great Britain | A. D. 1912 |
| 193,593 | Great Britain | Mar. 1, 1923 |
| 819,237 | France | July 5, 1937 |